United States Patent [19]
Hertel et al.

[11] 3,989,793
[45] Nov. 2, 1976

[54] INJECTION MOLDING OF RUBBER COMPOUNDS

[75] Inventors: Douglas L. Hertel, Strongsville; Sidney E. Rains, Medina, both of Ohio

[73] Assignee: International Basic Economy Corporation, New York, N.Y.

[22] Filed: June 18, 1975

[21] Appl. No.: 587,972

Related U.S. Application Data

[63] Continuation of Ser. No. 395,629, Sept. 10, 1973, abandoned.

[52] U.S. Cl. ............................... 264/329; 264/328
[51] Int. Cl.² ......................................... B29H 3/08
[58] Field of Search ............................ 264/328, 329

[56] References Cited
UNITED STATES PATENTS

| | | | |
|---|---|---|---|
| 2,478,013 | 8/1949 | Roddy | 264/329 X |
| 2,742,669 | 4/1956 | Rhodes | 425/97 X |
| 3,508,298 | 4/1970 | Seidl | 425/243 |
| 3,660,552 | 5/1972 | Hinz | 264/329 |
| 3,770,864 | 11/1973 | Bertrandi | 264/328 X |
| 3,878,285 | 4/1975 | Souffie | 264/329 |

*Primary Examiner*—Richard R. Kucia
*Attorney, Agent, or Firm*—Robert R. Jackson

[57] ABSTRACT

Vulcanization cycle times are substantially reduced in the injection molding of rubber compounds by forcing uncured, substantially unheated highly viscous rubber compounds through a thin flow channel upstream of the mold without supplying heat to the compound by conduction from an external source at any point prior to the mold. The compound is autogenously and quickly heated by the energy generated from the mechanical working of the compound under conditions of shear in the channel. The shearing action substantially reduces the compound's viscosity and increases its temperature above the critical residual scorch range as it passes through the channel. The downstream product is a rubber compound of significantly reduced viscosity having a substantially uniform temperature throughout, which is injected into a mold in a continuous flow and vulcanized.

11 Claims, 5 Drawing Figures

INJECTION MOLDING OF RUBBER COMPOUNDS

This is a continuation of application Ser. No. 395,629 filed Sept. 10, 1973, now abandoned.

BACKGROUND OF THE INVENTION

This invention relates generally to a method for reducing the vulcanizing cycle time in the injection molding of rubber compounds and, in particular, in the injection molding of rubber compounds using ram type injection molding equipment. Rubber compounds for injection molding operations generally comprise rubber, an accelerator, a vulcanizing agent, fillers, and various other additives. It is generally known in the art that vulcanizing cycle time, or the time the rubber remains in the mold to complete the cure, is a limiting factor in rubber injection molding operations because it controls the rate of output of molded articles from the apparatus. A continuing objective therefore is to reduce vulcanizing cycle time so the apparatus can be more efficiently used.

In a typical rubber injection molding process, the uncured viscous rubber compound is introduced to the elongated barrel of an injection molding machine at ambient temperatures. It is advanced through the barrel toward a mold connected to the downstream end of the barrel, usually by either a rotating screw conveyor or a reciprocating ram or piston disposed in the barrel. As the compound advances, it is heated by conduction in the barrel in order to reduce its viscosity and render it more flowable and amenable for subsequent injection into the mold. The less viscous the compound, the more easily it flows through the runners and gates and the more easily it fills the mold to produce a satisfactory molded object.

Since curing of the rubber compound is a "time at temperature" phenomenon, the heating also serves to supply some of the time at temperature requirement in the barrel without prematurely scorching the compound in the barrel. This increase in temperature of course reduces the time at temperature required in the mold and consequently the vulcanization cycle time. As known in the art, most rubber compounds can be cured at either a shorter exposure to a higher temperature or a longer exposure to a lower temperature, and it is this phenomenon which is referred to herein by the term time at temperature.

Cure time in ram injection rubber molding, for example, consists of three separate and distinct time at temperature periods. The first is the time at temperature during the compounding and storage of the material prior to entering the barrel of the injection molding apparatus and is referred to as the "process scorch time". The second time at temperature is the "residual scorch time" attained or permitted in the barrel of the apparatus. The higher the time at temperature during the process scorch time, the lower will be the time at temperature for residual scorch time in the barrel of the apparatus. The third time at temperature is the "vulcanization time" of the compound within the mold itself. The three periods of time together comprise cure time and the nature and degree of the time at temperature of the first two have an effect upon the third, vulcanizing time. Thus, a rubber compound that has been exposed to a higher time at temperature relationship during process time or during its passage through the barrel will vulcanize more quickly than a compound that has been exposed to lower conditions of time at temperature. Thus rubber compounds at higher temperatures will vulcanize more quickly than rubber compounds at a lower temperature. In most injection molding operations, a smaller portion of the time at temperature requirement is supplied in the barrel of the injection molding apparatus (the residual scorch time), and a larger part in the heated mold (the vulcanization time).

In addition to the cumulative effect of the above time at temperature periods, there is a critical temperature range for each rubber compound called the "critical residual scorch temperature range" at which the vulcanizing of rubber is initiated. These temperatures ranges are known to those skilled in the art. For the rubber compound used to obtain the data in Table I below, the critical scorch temperature range was 160°–170° F. Just above that temperature range the compound will begin to "scorch" or vulcanize in some period of time, which may be minutes or seconds Just below that temperature range vulcanization may require hours.

In a typical rubber injection molding process the objective is to heat the rubber compound to the maximum temperature, just below this critical scorch temperature range, which will produce the lowest viscosity of the compound at this limited temperature. The inability to supply more temperature or heat energy or time at temperature in the barrel so that vulcanization time in the mold can be reduced has been a continuous problem in prior art processes and apparatus. It is toward this problem that the present invention is generally directed.

The rubber compound is usually heated by externally heating the barrel of the apparatus electrically, with a steam jacket or from some other such external heat source, and transferrring the heat by conduction from the hot barrel wall into the mass of the rubber compound moving through the barrel. Some additional heat is usually supplied to the compound by frictional forces and by shearing of the rubber compound which occurs in the sprue, runners and gate system of the mold and, in many cases, this additional heat is an important factor depended upon for vulcanization. Once in the mole, additional heat is supplied to the compound and the compound is held in the mole for the required time at temperature for vulcanizing end to complete the cure.

Vulcanizing cycle time could be reduced if the compound could be rapidly and uniformly heated in the barrel to a higher temperature and then quickly injected into the mold so that more of the time at temperature required to cure the rubber compound had occurred before the compound entered the mold. However, the rubber compound cannot be exposed to high temperatures for even short periods of time in the barrel or undesirable scorching would take place before the rubber compound even entered the mold. One difficulty encountered in attempting to quickly and uniformly heat the compound, while it is still in the barrel, stems from the poor thermal conductivity of the compound. This makes it difficult to use external heat to quickly heat the compound to a uniform temperature throughout. To rapidly obtain the desired temperature in the portions of the compound distant from the heat source, e.g. the electricity or steam heated barrel wall, it is necessary for the heat source to have a temperature substantially above that desired in the compound. This produces local hotspots in the compound in proximity to the barrel wall which cause formation of an undesirable skin of scorched compound or prematurely vulcanized rubber compound near the barrel wall. This can produce undesirable pieces of cured compound in the material before it even reaches the mold for final curing of the rest of the product. These pieces can clog the sprue and mold runners and ruin the molded product. As a result, the temperature of the barrel wall is usually maintained sufficiently low to avoid such hot spots and is kept below the critical scorch temperature. Consequently, the compound temperature does not become excessively high so that only a relatively small portion of the time at temperature required to cure the rubber compound is provided in the barrel. Furthermore, the temperature of the compound varies throughout, with the compound more distant from the barrel wall cooler than that close to the wall. The result of these factors is that a longer vulcanization cycle is required once the compound is in the mold in order to provide the time at temperature required to complete the cure of the entire mass of material.

Various techniques have been proposed to more quickly and uniformly heat the compound entering the mold to high temperatures in the barrel. In one approach, a torpedo mounted to the barrel, nozzle, rotating shaft or some other portion of the apparatus is disposed in the barrel to form a thin annular channel between the torpedo and barrel wall. The barrel wall surrounding the thin channel is heated. Since only a thin film of compound is being heated, quicker and more uniform heating of the compound is obtained, although it is still considered necessary to preheat the compound upstream of the torpedo, with the torpedo heating step being but a supplementary heating of the material. There still remains, however, some variation between the temperature of the compound next to the barrel wall and that closer to the torpedo. To increase the heat transfer into the compound, it has been proposed to heat the torpedo as well as the barrel wall.

The heating of the compound increases its temperature and reduces its viscosity to produce a heated plasticized more flowable material suitable for injection into the mold. However, since the temperature of the injected material is not uniform, and since the time at temperature in the barrel is well below that required to cure the compound, relatively long vulcanizing cycles in the mold are still required. Other techniques for controlled heating of the compound have also been suggested such as high frequency or micro-wave heating.

Proposals have been made to utilize the energy released when viscous materials are mechanically worked under conditions of shear to heat plastics for use in either extrusion or injection molding processes. For example, U.S. Pat. Nos. 3,351,694 and 3,488,416 mentioned a plasticizing-extruder commonly known as the "elastic melt extruder" which utilizes for heating the normal force developed when a viscous material is sheared in a gap between a rotating plate and a stationary plate. U.S. Pat. No. 2,668,986 mentions the shear which occurs in the film of plastic passing through the gap between a rotating torpedo and the barrel wall of a screw type extruder or injection molding apparatus, although the barrel must still be externally heated. It is also known that heat is generated by the shear working which takes place in a screw conveyor injection molding apparatus or extruder although external heating of the barrel is usually also required, see, for example, U.S. Pat. No. 3,467,743 and "Ram v. Plunger Screw in Injection Molding," L. W. Meyer et al., Plastics Technology, pp. 39–45 (July 1962). The adiabatic operation of a screw type thermoplastic extruder has been proposed in which substantially all the heat arises from the mechanical working of the plastics through viscous shearing, see "Adiabatic Extrusion of Polyethylene," J. M. McKelvey et al., SPE Journal, pp. 22–30 (March 1954), and Plastics Extrusion Technology and Theory, Gerhard Schenkel, American Elsevier Publishing Co., Inc., New York, pp. 55–63 (1966). However, insofar as is known, no entirely satisfactory solution to the problem of more uniformly and quickly heating rubber compounds in a ram type injection molding apparatus has been proposed in which vulcanization cycle time is substantially reduced because more of the time at temperature requirement of the compound takes place in the barrel before the compound enters the mold, but in such manner that the compound is not prematurely vulcanized in the barrel.

It is therefore an object of this invention to provide a method by which rubber compounds can be quickly and uniformly heated to a substantially homogeneous relatively high temperature above the critical scorch range without supplying heat to the compound by conduction from an external heat source, whereby a substantial portion of the time at temperature requirement for curing the rubber takes place before the rubber compound enters the mold cavity so that vulcanization cycle times in the mold are substantially reduced.

It is another object of this invention to provide a method by which a highly viscous rubber compound is sheared in the barrel of a ram type rubber injection molding apparatus to thereby substantially lower its viscosity and autogenously increase its temperature, without substantially increasing the residence time of the compound in the barrel and without supplying heat to the compound by conduction from the barrel wall, to thereby produce a compound heated above its critical scorch temperature and having a substantially uniform temperature throughout which can be injected into a mold and quickly vulcanized therein.

It is another object of this invention to provide and method for forming in the barrel of a ram type rubber injection molding apparatus a substantially less viscous rubber compound than heretofore obtainable in such equipment which, because of its low viscosity, more completely fills the contours of the mold to produce precision molded objects having a smoother and more glossy surface than heretofore obtainable.

It is another object of this invention to provide a method for forming in the barrel of a ram type rubber injection molding apparatus a substantially less viscous rubber compound than heretofore obtainable in such equipment whereby gases entrapped in the compound readily escape in the mold.

It is another object of this invention to provide a method for forming in the barrel of a ram type rubber injection molding apparatus a substantially less viscous rubber compound than heretofore obtainable in such equipment whereby highly viscous compounds and compounds loaded with large amounts of fillers, which in many cases are processed in conventional equipment only with great difficulty, or if at all, are readily injected into the mold to form acceptable molded parts.

It is another object of this invention to provide a method for injection molding rubber compounds in a ram type rubber injection molding apparatus with reduced vulcanization cycle times in which no heat is supplied to the compound in the barrel by conduction from an external source thereby permitting shorter barrel length and shorter retention times in the barrel than are normally required in apparatus known to the art.

It is another object of this invention to provide a method which largely eliminates the dependence on the temperature rise of the rubber compound which occurs in the runners and gate systems of prior art apparatus.

These and other objects of the invention will be apparent to those skilled in the art from a consideration of this entire disclosure.

SUMMARY OF THE INVENTION

The above objectives are accomplished, in accordance with this invention, by passing a substantially uncured, highly viscous rubber compound through a channel located upstream of the mold cavity, and preferably located in the barrel of a rubber injection molding apparatus of the ram type upstream of the barrel outlet and the mold itself, which is sufficiently thin to shear the rubber as it passes through the channel, and substantially reduce its viscosity and increase its temperature as a result of the shearing to provide a heated plasticized rubber compound having a substantially uniform temperature throughout. The rubber compound can be quickly heated to a high temperature, without scorching or prevulcanizing, so that when it is subsequently injected into the mold, it can be quickly vulcanized therein since a substantial portion of the time at temperature requirement of the compound has been supplied in the channel with no substantial increase in the residence time of the compound in the barrel. This allows for significantly reduced vulcanization cycle time as compared to prior art processes and apparatus in which the compound injected into the mold is of nonuniform temperature and the bulk of the compound must be at a relatively low temperature in order to avoid the localized hotspots discussed above.

It has been found that by subjecting the compound to mechanical working under conditions which shear the rubber, energy is released throughout the rubber so that it is quickly and uniformly autogenously heated to the desired temperature without forming localized hotspots which can cause localized premature curing of the rubber. Because of the control which can be exercised on the temperature of the compound by varying factors such as the thickness of the flow channel, a significant portion of the heat energy which, in prior art devices, could not be added to the compound until it was in the mold can now be added before the compound enters the mold so that less heating time is required in the mold with a consequent decrease in the vulcanization cycle time. For example, the vulcanization cycle time of a polyisoprene rubber compound has been reduced more than 60% using the present invention.

It is the shearing of the rubber compound which is responsible for advantageously reducing its viscosity and it is the energy liberated when the compound is sheared which is responsible for autogenously elevating its temperature. Since the shearing action is taking place throughout the compound, energy is released throughout the mass which accounts for the highly uniform temperatures found in the sheared material. However, for substantial shearing to occur, it is necessary that the rubber compound entering the channel be sufficiently viscous to offer a significant resistance to flow and for this purpose the compound should have a viscosity of about 500,000 poises or more. For best results, it has been found that the rubber compound is sheared in the thin flow channel at a shear rate of about 10 to 1,000 reciprocal seconds, shear rate being a term whose computation and meaning are known to those skilled in the art.

The thin flow channel which subjects the compound to high shear is illustratively provided by placing a streamlined obstruction such as a torpedo in the barrel between the ram and the outlet of the barrel. The obstruction can be spaced from the barrel wall by peripherally projecting fingers which create a thin substantially annular channel between the obstruction and the barrel wall. The flow obstruction is preferably not integrally attached to the injection molding apparatus so that it can be conveniently removed and replaced in order to vary the width or the geometric configuration of the flow channel.

When uncured, substantially unheated, highly viscous rubber compound at ambient temperatures is subjected to the present invention, its viscosity can be drastically reduced, for example, by as much as from almost 50 million to 500,000 poises, while its temperature is simultaneously increased as much as about 150° F. solely by the energy liberated when the rubber is subjected to shear in the thin flow channel. It is not necessary during steady state operation to heat the compound from an external source such as the barrel wall since a sufficient viscosity reduction and temperature increase are generated by the mechanical working of the viscous material under conditions of shear in the thin flow channel.

By varying the nature and dimensions of the flow channel, variations in the extent of the viscosity reduction and temperature increase are obtainable. However, the thickness of the flow channel should not become too large because it will then permit the rubber compound to pass without effectively shearing it. Similarly, the flow channel should not be so thin that it becomes impractical to move the compound through it under feasible operating conditions. As discussed above, the viscosity of the compound fed to the flow channel must be sufficiently high to assure that shearing takes place in the channel. Normally this condition is readily met if the compound is substantially unheated as it enters the flow channel or enters the flow channel at an ambient temperature.

The invention is described more fully below in conjunction with the accompanying drawings.

DESCRIPTION OF THE PREFERRED EMBODIMENTS

Figure 1:
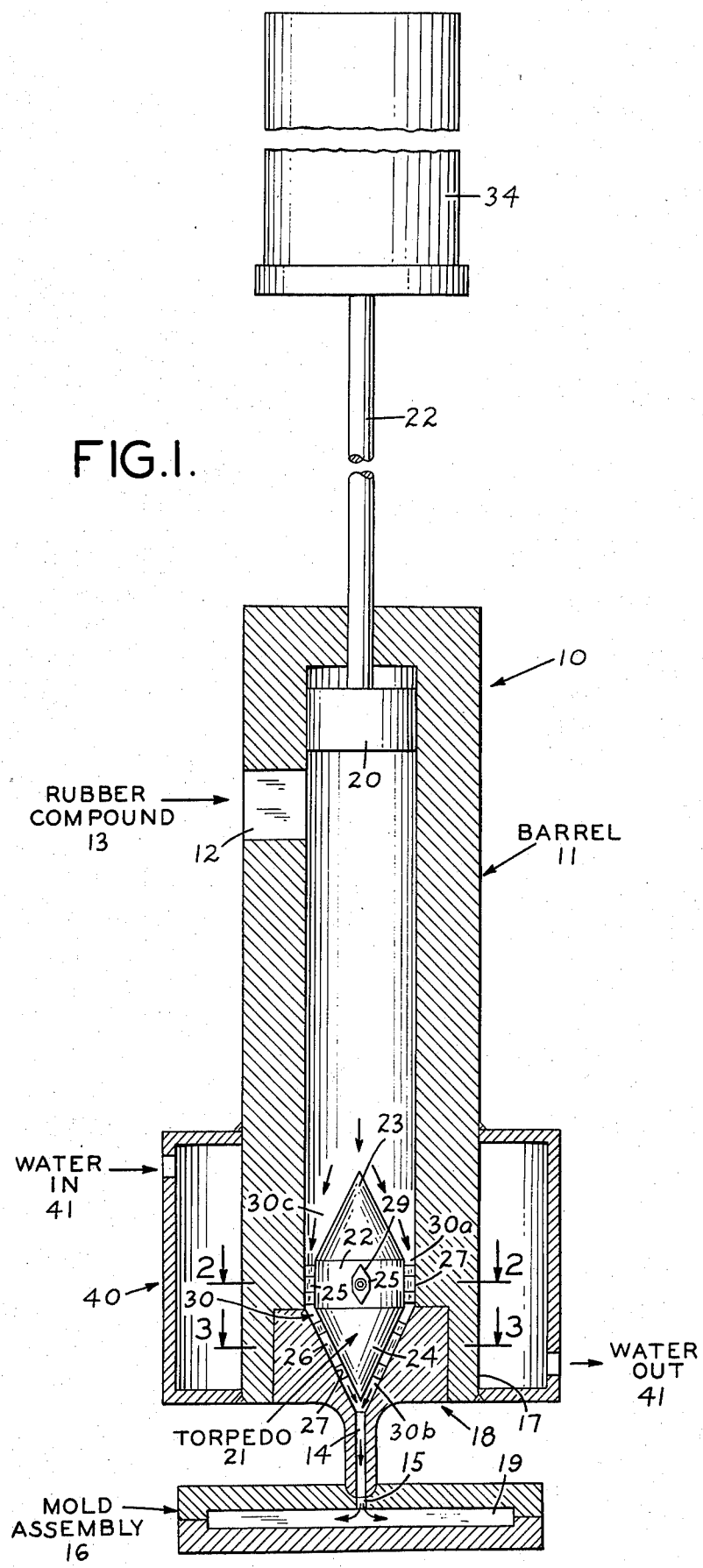
FIG. 1 is a schematic side view, partly in section, of a conventional rubber injection molding apparatus, illustrating the improvement of this invention.

FIG. 1 shows a conventional rubber injection molding apparatus 10 of the ram or piston type which has been modified to incorporate the improvement of the invention. One such apparatus is the Anderson Rubber Injection Molding Press available from Anderson IBEC, Strongsville, Ohio. The apparatus of FIG. 1 generally comprises an elongated hollow barrel 11 having an inlet 12 such as a hopper or chute for introducing rubber compound 13 to the barrel and an outlet or sprue 14 communicating with the runner and gate system (generally designated as 15) of a conventional mold assembly 16. The downstream end 17 of barrel 11 comprises a removable converging nozzle 18 which directs the compound to the runner and gate system 15 of mold assembly 16 which in turn feeds the mold cavity 19. A ram or piston 20 is disposed within the barrel for axial reciprocating movement in response to a conventional power source shown generaly at 34 to which ram 20 is attached by rod 22.

Figure 4:
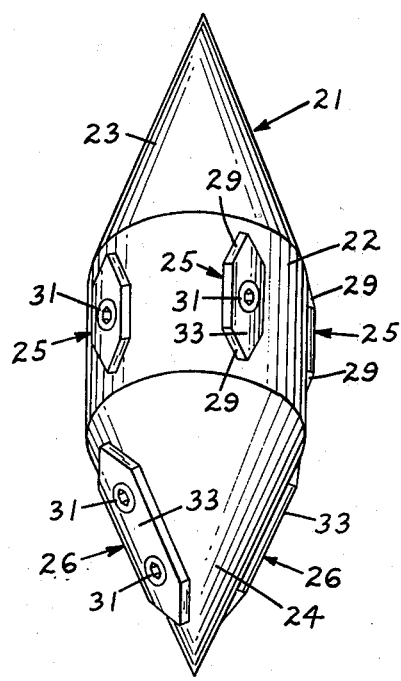
FIG. 4 is a perspective view of a torpedo suitable for use in the apparatus of the invention.
Figure 5:
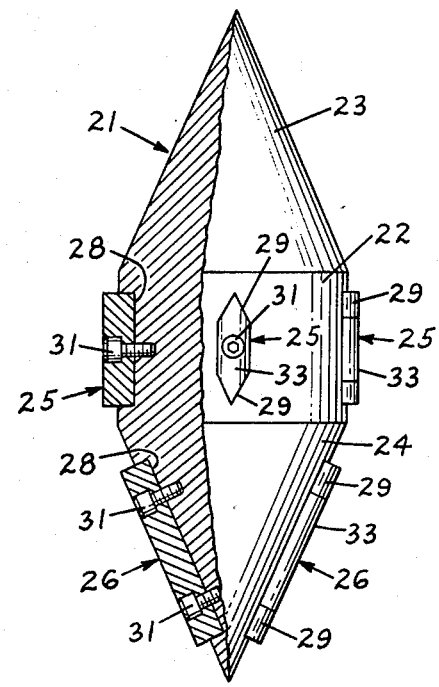
FIG. 5 is a side view, partly in section, of the torpedo shown in FIG. 4.

Turning now to the present invention, a free-floating streamlined torpedo 21 is emplaced in the barrel between the ram 20 and barrel outlet 14 (see FIGS. 1, 4 and 5). The torpedo has a central cylindrical section 22, and an upstream conical section 23 and a downstream conical section 24 each attached to opposite sides of section 22. Section 22 carries four equi-spaced (90° apart) peripheral spacing members 25 while section 24 carries two equi-spaced (180° apart) peripheral spacing members 26. These spacing members separate torpedo 21 from the inner wall 27 of barrel 11 and create a thin substantially annular flow channel 30 between the torpedo and the barrel wall which is interrupted only by members 25 and 26. Channel 30 must be sufficiently thin to shear the compound passing through it but not too thin to make it difficult or impossible to transport the compound through it. Illustratively, the thickness of channel 30 is about 20 mils to ⅝ inch. The channel thickness selected depends largely on the rheological properties and the time at temperature requirement of the particular rubber compound being processed. Generally, as the channel becomes thinner, the extent of shearing increases so that greater viscosity reductions and temperature increases occur in the compound as it passes through the channel.

Channel 30 comprises several portions such as the cylindrical annular channel 30a surrounding section 22 of the torpedo and the converging conical annular channel 30b surrounding section 24 of the torpedo which directs the rubber compound of reduced viscosity and increased temperature into sprue 14.

Figure 2:
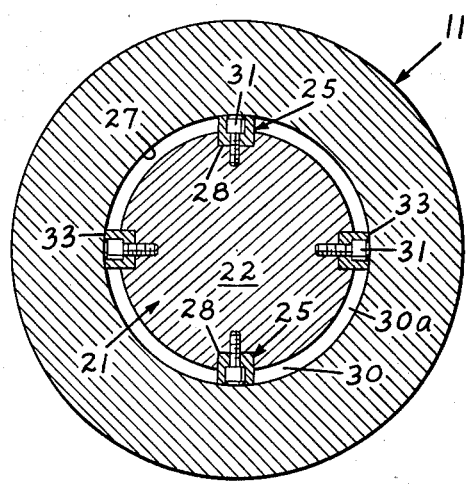
FIGS. 2 and 3 are sectional views taken along the lines 2—2 and 3—3, respectively, of FIG. 1.
Figure 3:
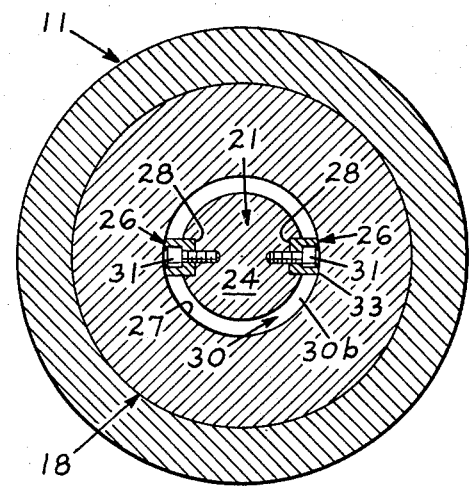

Torpedo spacing members 25 and 26 are removably mounted to torpedo 21 by screws 31 (see FIG. 5) and thus can be replaced by members of varying dimensions and configurations to vary the thickness of channel 30 to produce the desired viscosity reduction and temperature increase for a given rubber compound. The base of each spacing member 25, 26 rests in a groove 28 (FIGS. 2, 3 and 5) in the surface of the torpedo. Each spacing member 25, 26 has forward and aft tapered portions 29 (FIGS. 1, 4 and 5) to provide for streamlined flow of the compound around each member. The top of each spacing member 25, 26 is rounded as at 33 (see FIGS. 2, 3, 4 and 5) to match the rounded contour of the inner wall 27 of barrel 11.

Torpedo 21 can take any of a number of shapes, sizes or configurations although it is preferable that it be contoured for streamlined flow of the rubber compound around it. It is preferably fabricated from a metal such as aluminum, various alloys and such, which are compatible with the compound being processed at the conditions which exist in proximity to the torpedo. Any flow obstruction which will provide a sufficiently thin gap to shear the rubber in the barrel can of course be used in place of the torpedo shown in the drawings.

To remove or replace torpedo 21 or spacing members 25, 26 it is only necessary to separate mold assembly 16 from the barrel and remove the converging nozzle 18 at the end of the barrel, since the torpedo is not connected to any portion of apparatus 10.

Although most conventional ram type rubber injection molding apparatus, including the Anderson Rubber Injection Molding Press mentioned above, are equipped with means for heating the barrel (because barrel heating supplies a substantial amount of the energy input to the rubber compound in conventional rubber injection molding), the barrel 11 in the apparatus of the present invention is not heated during normal steady state operation since the shearing of the compound in channel 30 provides the desired viscosity reduction and generates sufficient heat autogenously within the compound. In some cases, the amount of heat liberated by passage through channel 30 is so great that the barrel wall must be cooled to remove the heat from the compound in order to prevent premature curing in the barrel. The barrel wall can be cooled by any of a variety of techniques such as, for example, by enclosing it within a jacket 40 (see FIG. 1) through which cooling water 41 is continuously circulated while the aparatus is in operation. Jacket 40 surrounds the torpedo 21 and channel 30 and also extends a short distance (e.g. 5–12 inches) upstream of torpedo 30 to remove the heat carried to the upstream portions of the barrel wall by conduction from the shear zone surrounding the torpedo. The cooling of the barrel wall in proximity to the torpedo is in contrast to prior art injection molding apparatus in which the barrel is heated in order to heat the compound by conduction as it passes the barrel wall.

In operation, rubber compound 13 is fed to barrel inlet 12 in a substantially unheated state at substantially ambient (e.g. 10° to 110° F.) temperature. The compound can be of any type conventionally used to prepare injection molded parts. It includes natural or synthetic rubbers or elastomers, various rubber and elastomer co-polymers and such well known materials as neoprene rubber, butyl rubber and the like. As known in the art, the rubbers often are formulated to contain a variety of fillers and additives to impart various desirable properties to the molded product and such modified rubber compositions can also be used in the present invention.

The rubber compound 13 is highly viscous and illustratively has a viscosity of about 500,000 to 50 million poises although many of the more commonly molded compounds have viscosities at the lower end of this range, e.g. 500,000 to 5 million poises. The compound 13 is normally not preheated although it may be preheated provided the heating does not significantly affect the high viscosity of the material. As previously discussed, the compound must be highly viscous in order to be sheared in channel 30 and achieve the desirable results of viscosity reduction and increased temperature.

After the compound 13 is in barrel 11, ram 20 advances pushing the compound through the barrel and toward and against the upstream edge of torpedo 21 where, under the pressure exerted by the ram, it spreads around the torpedo and passes through the annular channel 30 between the torpedo and barrel wall. Torpedo 20 is wedged into the converging nozzle 18 of the barrel (as shown in FIG. 1) where it remains stationary, without any substantial rotational or axial movement, during the injection stroke of the of the apparatus. The walls of channel 30 are thus formed by the stationary barrel wall and the stationary outer surface of torpedo 21.

As the rubber compound passes through channel 30 it is subjected to moderately high conditions of shear which substantially reduce its viscosity and quickly increase its temperature above the critical scorch temperature. Since the barrel wall of the apparatus is not heated, these changes in the compound result substantially solely from the mechanical working of the compound which occurs in channel 30.

As the compound reaches the upstream edge of the torpedo, it is still in a substantially unheated, highly viscous condition since the barrel wall is not externally heated. As it reaches torpedo 21, the cross-section area of the barrel is gradually reduced as a result of the diverging conical annular flow channel 30c between the barrel wall and conical section 23 of the torpedo. Some shearing of the compound begins in channel 30c but most of the shearing occurs in the narrower channels 30a, 30b because of the more strenuous mechanical working of the highly viscous compound which occurs in these channels.

If the compound's viscosity had been significantly reduced prior to its reaching the upstream edge of the torpedo, as by external heating of the barrel for example, it would tend to flow through channels 30a, 30b without being subjected to sufficient mechanical working to shear it to the point where a substantial viscosity reduction and temperature increase would occur. It is believed that a main reason materials are not significantly sheared in prior art devices which use a torpedo arrangement is because the material, prior to reaching the torpedo, had been preheated to reduce its viscosity to the point where no significant shearing of the material occurs as it passes the torpedo. This is confirmed by the fact that in most such prior art devices, the barrel wall surrounding the torpedo must be heated. If significant shearing were occurring in these devices, enough heat would be internally generated to render barrel heating unnecessary. For purposes of comparison, the viscosity of most plastic materials reaching the torpedoes of conventional processing equipment is believed to be on the order of 100 to 1,000 poises as compared to the 500,000 to 50 million poises of the compound in the present invention. At viscosities of 100 to 1,000 poises, no significant shearing takes place as the material passes the torpedo and consequently there is no significant viscosity reduction or temperature increase as in the present invention.

As the rubber compound leaves the channel 30 and enters sprue 14 it is in a heated, plasticized, flowable condition illustratively having a viscosity of only about 1,000 to 500,000 poises and a temperature of 20° to 150° F. higher than the inlet rubber compound and above the critical scorch temperature. For many of the more common injection molded rubber compounds, the sheared rubber has viscosities of about 5,000 to 200,000 poises and temperatures about 50° to 120° F. higher than the unsheared compound upstream of the torpedo. Therefore, depending on the temperature of the unsheared compound, the sheared compound could have a temperature which illustratively is about 100° to 250° F.

The heated plasticized sheared rubber compound has a temperature which is substantially uniform throughout the mass since the heat is liberated throughout the entire rubber mass as it passes through channel 30. By uniform temperatures is meant that the temperature from point to point in the rubber compound does not vary by more than about 10° F. If the shearing of the compound should tend to generate excessively high temperatures, water can be circulated through jacket 40 to keep the compound at the desired temperature. It has been found that, because of the low viscosity of the sheared compound, little additional shearing occurs in the runners and gates 15 of the mold so that the vulcanization cycle in the mold is controlled substantially entirely by shearing the compound as it flows past the torpedo in the barrel. This is an advantage since, in some of the prior art apparatus, dependence is placed upon the additional temperature rise which takes place in the runners and gates of the mold because of shear. When molds are modified, the effect of these parameters on the vulcanization cycle likewise changes and new effective operating conditions must be determined. With the present invention, mold modifications should have little effect on operating conditions.

Another advantage of the low viscosity of the sheared rubber compound produced in the present invention is that it is substantially more liquid than most injection molded rubber compounds and can therefore better follow the surface contours of the mold cavity and more effectively fill the cavity. The result is a molded part with a smoother surface and higher gloss.

It has also been found that gases entrapped in the sheared compound readily escape from the material once in the mold, apparently because of its low viscosity, so that the need for "bumping" the mold to remove such gases is eliminated.

The extent to which the compound viscosity is reduced in the present invention also makes it possible to conveniently handle highly viscous materials or compounds containing large amounts of fillers or additives which are difficult to injection mold using conventional equipment.

Substantially shorter vulcanization cycle times are obtainable in the present invention because the compound can be quickly and uniformly heated to relatively high temperatures before entering the mold cavity. Consequently, less of the time at the temperature requirement need be supplied in the mold so that vulcanization cycle time is greatly reduced.

The vulcanization of rubber compounds is an exothermic reaction. Once temperatures above the critical scorch temperature range have been attained, vulcanization is initiated. Upon attaining such temperatures, the temperature of the compound continues to rise and vulcanization increases more rapidly even if no subsequent energy is supplied to the system from an external source. Substantially shorter vulcanization cycle times are obtainable in the present invention because the rubber compound has been heated to vulcanizing temperatures prior to entering the mold and the internal temperature of the molded part in the mold is automatically increasing despite any external heat source. In the conventional ram injection rubber molding operation, the temperature of the rubber compound in the barrel of the machine must be kept below the critical scorch temperature range and below that temperature at which vulcanization is initiated. In order for these compounds, in conventional equipment, to be heated to vulcanization temperatures, energy must be supplied from the platens of the mold and transferred throughout the compound which has a very low heat conductivity.

The conditions necessary for reduced vulcanization cycle times can vary from compound to compound since such factors as the time at temperature requirement and the rheological properties vary for different compounds. Operating conditions can be readily altered to accomodate for these differences by varying the thickness of channel 30 and/or the configuration of torpedo 21. The ram pressure can also have an influence.

The torpedo can be located at any convenient position upstream of the mold cavity and one or more torpedoes could be used aligned either in series or parallel. For example, one or more torpedoes could be disposed in the sprues or runners, or at varying locations in the barrel of the apparatus.

The following example is provided to further illustrate the invention.

EXAMPLE

To demonstrate the effectiveness of the invention, two series of experimental runs were made in the same injection molding apparatus except that in one run a torpedo was inserted in the barrel of the apparatus in accordance with the invention and in the other run no torpedo was used.

The apparatus used was a 450 ton Anderson Rubber Injection Molding Press, a unit commercially available from Anderson IBEC, Strongsville, Ohio. The press is a conventional rubber injection molding apparatus of the ram type having a barrel diameter of about 3.69 inches.

The torpedo used was that shown in FIGS. 4 and 5. The total axial length of the torpedo was 9½ inches. The axial length of the central cylindrical sections was 2½ inches and the length of each of the conical sections was 3½ inches. The angle of each conical section was 25°. The four spacing members on the central cylindrical section were disposed in the middle of the section and were 1½ inches long and 1 inch wide. Each member extended about 0.30 inch outwardly from the surface of the section. The two spacing members on the downstream conical section were disposed in the middle of the section and were 2½ inches long and ¾ inch wide. Each also extended about 0.30 inch outwardly from the surface of the section. Thus, the annular flow channel created in the barrel of the apparatus when the torpedo was installed had a thickness of about 0.30 inch.

The injection molding compound used in each run was highly viscous cork and carbon loaded synthetic polyisoprene rubber. The cork content was about 2% and the carbon content in the range of 10 to 20%. The compound also contained a conventional accelerator and vulcanizing agent.

The mold was of a circular configuration having a diameter of about 6 inches and a general thickness of about ⅛ inch except for three thin concentric rings having diameters of about 2, 4 and 6 inches which had a thickness of about ¼ inch. The mold was sandwiched between an upper and lower platen each of which was heated in order to heat the compound once it was in the mold.

The first run was carried out without the torpedo being present in the barrel, in accordance with the normal mode of operation of the apparatus. The barrel was electrically heated and barrel temperature was maintained at about 140° F. throughout the operation. It was necessary to heat the barrel to this temperature in order to initiate and continue flow of the compound through the apparatus during operation. Several series of tests were made at these conditions and various operating parameters were noted. The molded articles were visually inspected for quality, and durometer readings were made on each article using a Shore Type A Durometer.

The second series of runs was carried out in substantially the same manner as the first except that the torpedo was inserted in the barrel in the manner shown in FIG. 1. Before starting the run, the barrel was preheated to 110° F. in order to get initial flow of the compound in the apparatus. This could alternately be accomplished without heating the barrel in the case where the torpedo is present by several preliminary shots of the ram which would warm the compound up enough to start it flowing. However, preheating of the barrel has been found more convenient. In cases where no torpedo is present, the barrel must always be heated to initiate and continue flow, and it must be heated well above 110° F. for this purpose.

Once the barrel was preheated to 110° F., the barrel heat was turned off and the viscous rubber compound was introduced into the barrel at ambient temperature. During the interval of operation, the barrel temperature remained at about 110° F. although prolonged operation (on the order of 20 to 40 shots or more) did cause the barrel temperature to rise because of the energy liberated during the shearing of the rubber. In such cases, the barrel was cooled to maintain approximately 110° F.

Results are tabulated in Table I below for each of the runs:

TABLE I

|  | Shot No. | Barrel Temp. (° F.) | Sprue Temp. (° F.) | Upper Platen Temp. (° F.) | Lower Platen Temp. (° F.) | Injection Pressure (psi) | Injection Cycle Time (sec.) | Vulcanization Cycle Time (sec.) | Durometer Reading |
|---|---|---|---|---|---|---|---|---|---|
| No torpedo present in barrel | 1 | 140 | 140 | 395 | 395 | 1650 | 14 | 120 | 54 |
|  | 2 | 140 | 140 | 395 | 395 | 1650 | 14 | 90 | 55 |
|  | 3 | 140 | 140 | 395 | 395 | 1650 | 14 | 80 | 48 |
| Torpedo present in barrel | 1 | 110 | 200 | 395 | 395 | 1600 | 12 | 90 | 53 |
|  | 2 | 110 | 200 | 395 | 395 | 1600 | 12 | 25 | 54 |
|  | 3 | 110 | 200 | 395 | 395 | 1600 | 12 | 60 | 55 |
|  | 4 | 110 | 200 | 395 | 395 | 1600 | 12 | 45 | 55 |
|  | 5 | 110 | 200 | 395 | 395 | 1600 | 12 | 30 | 55 |
|  | 6 | 110 | 200 | 395 | 395 | 1600 | 12 | 25 | 53 |

The results in Table I show that when no torpedo was present, there was no increase in the temperature of the rubber compound during the injection stroke since the barrel temperature and sprue temperature remained the same. The durometer readings began to fall off at a vulcanization cycle time of 80 seconds, indicating that the compound was not yet fully cured and required more time. Since acceptable durometer readings were obtained at 90 seconds, the vulcanization cycle time with no torpedo present was about 90 seconds. The molded product from the non-torpedo run was non-glossy.

These results contrast sharply with those obtained when the torpedo was used since the data of Table I show that acceptable molded products, as indicated by acceptable durometer readings, were obtained with optimum vulcanization cycle times as short as 30 seconds. This represents a 66% or ⅔ reduction in vulcanization cycle time as compared to the 90 seconds required when no torpedo was used. There was also a 90° F. temperature increase in the compound during the injection stroke as indicated by a sprue temperature of 200° F. compared to a barrel temperature of 110° F. Thus the temperature of the compound was raised by its passage through the channel between the torpedo and barrel wall. The molded product was glossy indicating that mold pressure was much higher than in the case where no torpedo was used. The increased mold pressure indicates that the viscosity of the compound as it entered the mold was much lower than in the case where no torpedo was used. Thus the viscosity of the compound was greatly reduced by its passage through the channel between the torpedo and barrel wall.

Attempts to operate the apparatus at a barrel temperature of 110° F. without the torpedo were unsuccessful because the compound remained too viscous to flow into the mold. Yet when the torpedo was used, the apparatus operated without difficulty at 110° F. to produce a molded product of excellent quality with a remarkably short vulcanization cycle time. This highlights the significant effect of the viscosity reduction and temperature increase imparted to the compound by its passage through the channel between the torpedo and barrel wall, an effect due solely to the shearing of the compound which takes place in this channel since barrel heat was not applied during the injection stroke.

Referring to the above example, mathematical calculations may be made which characterize the residence time of the compound in the barrel with and without the torpedo and the time required to force one shot of compound past the torpedo and into the sprue. The compound in the first series of runs (without the torpedo) was in the barrel for 57 minutes or 3,420 seconds. The initial temperature of the compound was 70° F. and the temperature of the compound at the wall of the barrel upon issuing from the barrel was 140° F., well below its critical scorch temperature of 160°–170° F. The mean temperature of the cross sectional mass of compound at the bottom of the barrel was in the neighborhood of about 120°–130° F.

In the second series of runs (with the torpedo present), the temperature of the compound just above the torpedo was 110° F. Upon discharge from the sprue the temperature was 200° F., well above its critical scorch temperature of 160°–170° F. The time rquired to force the shot of the mass across the torpedo and into the mold was twelve seconds. The time at temperature for the first series or runs was 3,420 seconds at 70°–130° F. and the time at temperature for the second series of runs (with the torpedo) was twelve seconds at 110° to 200° F. This significant change in the time at temperature relationships by the use of the present invention reduced the optimum vulcanization time from 90 seconds to 30 seconds. In the present invention, the critical scorch temperature can be exceeded in the barrel without adverse result because the rubber compound remains in the barrel only a short time after the scorch temperature is obtained. Thus although vulcanization is desirably initiated in the barrel, the vulcanization is not completed until the rubber compound is in the mold. On the other hand, vulcanization cannot be initiated in the barrel with most prior art apparatus because of the lengthy residence time required in the barrel which will cause at least a part of the rubber compound to undesirably vulcanize in the barrel to the point where it adversely affects the quality of the final molded product.

The detailed and specific information set forth above is by way of illustration only and such alterations and modifications thereof as would be apparent to those skilled in the art are deemed to fall within the scope and spirit of the invention which is defined only by the claims appended hereto.

What is claimed is:

1. A method for injection molding rubber having a viscosity of about 500,000 to 50 million poises at ambient temperature in a ram type injection molding apparatus having a barrel which is unheated by an external heat source and in which a piston reciprocates, a stationary torpedo which is unheated by any external heat source and which is located in the end of the barrel downstream of the piston to form an annular channel between the torpedo and barrel wall, and a mold cavity operatively connected to the barrel downstream of the annular channel, said method comprising the steps of:

conducting the rubber to the torpedo at substantially ambient temperature and with a viscosity of about 500,000 to 50 million poises by operation of the piston;

passing the rubber around the torpedo and through the annular channel between the torpedo and barrel wall by operation of the piston to form an annular film of the rubber and to shear the rubber in the channel and thereby substantially decrease its viscosity and autogenously heat the rubber to a temperature above the critical scorch temperature to produce a heated, flowable rubber having a substantially uniform temperature throughout and initiate vulcanization of the rubber while still in the barrel, the heating of the rubber resulting substantially solely from the shearing of the rubber in the annular channel and without supplying heat to the rubber as it passes through the annular channel by conduction from any external heat source;

injecting the heated, flowable rubber exiting from the annular channel into the mold cavity substantially prior to completion of vulcanization of the rubber; and completing vulcanization of the rubber in the mold cavity.

2. The method defined in claim 1 wherein the viscosity of the rubber entering the annular channel between the torpedo and the barrel wall is about 500,000 to 5 million poises.

3. The method defined in claim 1 wherein the viscosity of the rubber exiting from the annular channel between the torpedo and the barrel wall is about 1,000 to 500,000 poises.

4. The method defined in claim 3 wherein the temperature of the rubber exiting from the annular channel between the torpedo and the barrel wall is about 20° to 150° F. higher than that of the rubber entering the channel.

5. The method defined in claim 1 wherein the rubber is passed through an annular channel between the torpedo and the barrel wall having a thickness in the range from about 20 mils to about ⅝ inch.

6. The method defined in claim 5 wherein the viscosity of the rubber entering the annular channel between the torpedo and the barrel wall is about 500,000 to 5 million poises and wherein the viscosity of the rubber leaving the channel is less than about 200,000 poises and its temperature is about 50° to 120° F. higher than that of the rubber entering the channel.

7. The method defined in claim 1 further comprising the step of cooling the rubber at least in proximity to its passage through the annular channel between the torpedo and the barrel wall.

8. The method defined in claim 1 wherein the rubber is selected from the group consisting of (1) natural or synthetic rubbersor elastomers and (2) rubber or elastomer copolymers.

9. The method defined in claim 1 wherein the rubber is selected from the group consisting of neoprene and butyl rubber.

10. The method defined in claim 1 wherein the rubber is conducted to the torpedo at a temperature in the range from about 10° to about 110° F.

11. The method defined in claim 1 wherein the rubber leaving the annular channel between the torpedo and the barrel wall has viscosity of about 5,000 to 200,000 poises and temperature about 50° to 120° F. higher than that of the rubber entering the channel.

* * * * *